3,161,626
PROCESS FOR THE PRODUCTION OF POLYPROPYLENE
André Fournet and Michel Ruaud, Lyon, and Yannik Bonnet, Tassin la Demi-Lune, France, assignors to Societe des Usines Chimiques Rhone-Poulenc, Paris, France, a French body
No Drawing. Filed Feb. 2, 1959, Ser. No. 790,320
Claims priority, application France Feb. 8, 1958
16 Claims. (Cl. 260—93.7)

The present invention concerns a new process for the production of solid polypropylene.

It is known that the polymerization of propylene is considerably more difficult than that of ethylene, and that many catalysts by means of which polyethylenes of good quality can be obtained give only oily polymers when applied to the polymerisation of propylene.

It has already been proposed to polymerise propylene to give solid polypropylene in the presence of catalysts obtained by the reaction of compounds of metals of the 4th to 6th groups of the Periodic Table with metals, alloys, hydrides or organometallic compounds of the 1st to 3rd groups of the Periodic Table. There has been described, in particular, the preparation of a catalyst by crushing for 36 hours an alloy of composition $Mg_3Al_2$ in hexane with titanium tetrachloride; the titanium tetrachloride is reduced with the formation of a grey-black suspension which contains a titanium chloride in which the valency of the titanium is less than 4, magnesium chloride, and aluminium chloride formed in the reaction of the alloy with the titanium tetrachloride, and unchanged alloy. This suspension was employed for the polymerisation of propylene to give polypropylene.

It was subsequently pointed out that the catalysts obtained by reducing titanium halides with aluminium-magnesium alloys have the disadvantage that the polymers obtained are not very crystalline and that, if even a little unconverted titanium tetrachloride remains after the reaction, oily liquid polymers are obtained which are similar to those obtained with Friedel-Crafts catalysts.

There has also been described the polymerization of ethylenic hydrocarbons by contact with a suspension of a reaction product of aluminium chloride, titanium tetrachloride and an alkali metal in an organic solvent, the molar ratio of the alkali metal to the aluminium chloride being between 0.1:0.5 and 1, and preferably 1:1. There has been described in particular the polymerisation of propylene by means of catalysts prepared in an ethylene atmosphere by reaction between metallic potassium, aluminium chloride and titanium tetrachloride in molar ratios of 1:1:0.2. The catalyst prepared under such conditions is in fact an organoaluminium/titanium chloride complex. Hall and Nash J. Inst. Petrol. Techn. 23, 679 (1937), have shown that when ethylene is brought into contact with aluminium chloride and a metal capable of reducing aluminium chloride, dichloroethyl aluminium is formed. However, the polypropylene yields said to be obtained were extremely low and the proposed catalysts cannot be used for production on an industrial scale.

It has also been proposed in a general way to employ as polymerisation catalysts for propylene divalent titanium derivatives obtained by various methods, including the reduction of titanium tetrachloride by means of metals. However, only the use of reaction products of titanium tetrachloride and an organometallic compound has been specifically described, and experiments undertaken by the applicants have shown that titanium dichloride alone does not catalyse the polymerization of propylene, regardless of the manner in which it is formed.

It is an object of the present invention to provide a novel method of polymerising propylene by means of which a solid product can be obtained. A further object is to produce a solid polypropylene of high intrinsic viscosity. A yet further object is to provide a new and effective catalyst for the polymerisation of propylene, and a method whereby this catalyst can be obtained. Further objects will become apparent in the course of the following description.

It has now been found that solid polypropylene is obtained exclusively if the polymerisation of the propylene is carried out in the presence as catalyst of a mixture of titanium dichloride and aluminium in which the aluminium has been obtained by reducing an aluminium trihalide with an alkali metal at an elevated temperature in an inert atmosphere and in the absence of reactive hydrocarbons (i.e. hydrocarbons, especially olefines, capable of polymerising under the conditions employed), the atomic ratio of aluminium to titanium in the mixture being at least 2:1, and especially between 2:1 and 10:1, the mixture being free from higher chlorides of titanium.

The aluminium in the new catalyst is in a particularly active form. It has been found that if this aluminium is replaced by ordinary aluminium powder or by an aluminium-magnesium alloy, the product of the polymerization is primarily liquid polypropylene containing traces of solid polypropylene.

It is necessary for the mixture of the titanium dichloride with the aluminium to be as intimate as possible. In order to achieve this, it is desirable to carry out the reduction of the aluminium halide in the presence of the titanium dichloride or a compound from which it is formed. A particularly good result is obtained when the titanium dichloride and aluminium are produced simultaneously, by reducing a mixture of titanium trichloride or tetrachloride with the aluminium halide, using enough alkali metal to carry out both reductions completely. The alkali metal chloride produced by the reaction does not interfere with the subsequent polymerisation of the propylene.

The aluminium halide employed may for example be aluminium chloride or aluminium bromide.

The alkali metal employed will usually be sodium, potassium or lithium, or an alloy thereof, for example a sodium-potassium alloy.

The reduction of the aluminium halide, preferably with a titanium chloride as described above, is preferably carried out in the presence of a diluent which does not react with the alkali metal, more especially one or more aliphatic, cycloaliphatic or aromatic hydrocarbons, such as octane, cyclohexane and its homologues, and benzene and its homologues; preferably the hydrocarbon diluent is a good solvent for aluminium chloride. The alkali metal is preferably finely dispersed in the diluent. The reduction is advantageously carried out between 80° and 110° C., and in any case preferably above the melting point of the alkali metal, and either at atmospheric pressure or under constant volume conditions in an autoclave, depending upon the boiling point of the diluent. The product of the reduction takes the form of a powder in suspension in the diluent.

Argon is particularly suitable as the inert atmosphere in which the reduction is carried out, especially when operating continuously, since it considerably prolongs the time for which the catalyst remains active. However, other inert gases and vapours, e.g. nitrogen, can also be used with good results.

It is important that all the aluminium halide should be reduced. If the reduction is incomplete, that is to say if any aluminium halide remains in the catalyst mixture, appreciable amounts of oily polypropylene are formed. Any unreduced aluminium halide residues can be eliminated by separating the solid catalyst by decantation or filtration, washing it with a solvent for the aluminium halide, such as an aromatic hydrocarbon, more especially toluene, and thereafter again mixing it with an appropriate diluent.

As stated above, the catalyst must contain at least 2 atoms of the active aluminium for each molecule of titanium dichloride. A lower ratio does not give such good results. A ratio of 3 to 5 aluminium atoms for each molecule of titanium dichloride is particularly advantageous.

For use in the polymerisation of the propylene, the catalyst mixture is preferably in suspension in a diluent which may be the same as or different from that in which it was made. The polymerisation may be effected at any temperature between room temperature and 200° C., but is preferably carried out at an elevated temperature, desirably at a temperaturre of the order of 100° C., i.e. between about 95° and 105° C., and under a pressure of the order of 10 to 50 atmospheres. The polymerisation may be effected batchwise or continuously.

The solid polypropylene formed may be freed from the catalyst by washing, preferably with a mixture of methanol and hydrochloric acid.

By means of the invention there can be obtained solid polypropylene of excellent quality, having more especially a high specific viscosity.

The following examples illustrate the invention without limiting it:

Example I

Into a stainless steel 500 cc. shaker-type autoclave carefully flushed with dry nitrogen are introduced 3.6 g. of aluminium chloride, 2.20 g. of sodium, 1.2 g. of titanium dichloride, 125 cc. of dry toluene and 8 stainless steel balls having a diameter of 8 mm. The autoclave is heated to 110° C. for 3 hours with agitation, and then cooled; 60 g. of dry propylene are introduced and the mixture is heated again with agitation for 16½ hours at 100° C.

After cooling, unconverted propylene is blown off, leaving in the autoclave a solid mass of polypropylene blackened by the catalyst. This is heated with a mixture of methanol and hydrochloric acid, then washed successively with water and methanol, and finally dried in vacuo at 80° C. 18 g. of the dried polymer are obtained. It can be compression-moulded at 170° C. to form strong slabs. Its specific viscosity, measured at 130° C. at a concentration of 0.4% in "Tetralin," is 1.5.

Example II 2.5 g. of sodium and 125 cc. of toluene are introduced under nitrogen into a spherical 500 cc. Pyrex flask provided with a reflux condenser, a tube for the introduction of nitrogen and a system for agitation by vibration. The mixture is brought to boiling temperature, agitated, and allowed to cool to about 80° C. while the agitation is continued. 5 g. of aluminium chloride are introduced into the flask, and the mixture is again brought to boiling temperature, still with vigorous agitation. These conditions are maintained for 2 hours. At the end of this time, the yellow toluene solution has become discoloured, and a solid grey-black suspension has been formed. This suspension is carefully washed with toluene in a nitrogen atmosphere to eliminate all traces of aluminium chloride. It is then introduced under nitrogen into the autoclave described in Example I with 1.3 g. of titanium dichloride, 125 cc. of toluene and 8 stainless steel balls. 52 g. of propylene are introduced and the mixture is heated with agitation at 100° C. for 15½ hours.

By proceeding as in Example I, 7 g. of propylene are recovered and 43 g. of solid polymer having the same characteristics are obtained.

Example III

A grey-black suspension is prepared, by the method described in Example II, from 2.45 g. of sodium, 4.8 g. of aluminium chloride and 100 cc. of toluene. This suspension is washed with toluene and then with cyclohexane, and is transferred into the autoclave of Example I under nitrogen with 1.3 g. of titanium dichloride, 125 cc. of dry cyclohexane and 8 stainless steel balls. Dry propylene is introduced and the mixture is heated at 100° C. for 16 hours. The polypropylene, obtained after being treated as in Example I, weighs 16 g. and its properties are similar to those of the product of Example I.

Example IV

Into the autoclave described in Example I are introduced under nitrogen 4.12 g. of aluminium chloride, 1.52 g. of titanium trichloride, 2.5 g. of sodium (the quantity theoretically needed to reduce both the aluminium chloride to metal and the titanium trichloride to dichloride), 125 cc. of toluene and 8 stainless steel balls. The mixture is heated with agitation at 110° C. for 2 hours and cooled; dry propylene is introduced, and the mixture is again heated with agitation at 100° C. for 16 hours.

By proceeding as described in Example I, there are obtained 30 g. of polypropylene similar to that of Example I.

If less sodium is used, the polymerising operation is an almost complete failure.

Example V

A catalyst suspension is prepared by the method described in Example II from 4 g. of aluminium chloride, 1.9 g. of titanium tetrachloride, 2.65 g. of sodium (the quantity theoretically needed to reduce both the aluminium chloride to metal and the titanium tetrachloride to dichloride) and 100 cc. of toluene. This suspension is decanted, and washed successively with toluene, cyclohexane and again with toluene to eliminate all traces of aluminium chloride and titanium tetrachloride. It is then introduced with 8 stainless steel balls into the autoclave described in Example I under nitrogen. 56 g. of propylene are then introduced and the mixture is heated at 100° C. for 16 hours. No gaseous propylene is recovered. By proceeding as described in Example I, there are obtained 55.5 g. of solid polymer similar to that of Example I.

Example VI

Into a stainless steel 500 cc. autoclave are introduced 24 g. of aluminium chloride, 16 g. of sodium, 11.6 g. of titanium tetrachloride, 300 cc. of toluene and 10 stainless steel balls 8 mm. in diameter. The atmosphere of the autoclave is replaced by argon, which is introduced 5 times in succession under a pressure of 10 atm. and then allowed to escape. The mixture is thereafter heated at 110° C. with agitation for 3 hours and allowed to return to room temperature with continuous agitation. The contents are transferred into a 5 litre autoclave while preventing absolutely any access of air, 1200 cc. of deaerated cyclohexane are added and the mixture is treated as before with argon. The temperature is raised to 100° C. and propylene is added until a pressure of 21 atm. is reached, which is maintained by periodically introducing further propylene, the temperature being held between 100° and 104° C. throughout.

The polymerisation reaction becomes more and more exothermic and the heating is accordingly reduced. At the end of 3 hours it is necessary to apply cooling, since the temperature rises spontaneously to 108° C. The polymerisation is stopped after 3½ hours, when 975 g. of propylene have been introduced. The polypropylene obtained is purified by treating it with methanol containing hydrochloric acid. 757 g. of polypropylene are obtained, 93.7% thereof being insoluble in cold heptane.

If the argon is replaced by nitrogen, all the other conditions remaining unchanged, only 42 g. of polypropylene, of which 89.5% is insoluble in heptane, are obtained after the introduction of 600 g. of propylene in 4½ hours.

Example VII

Into a 500 cc. autoclave are introduced 1.9 g. of titanium tetrachloride, 1 g. of sodium and 250 cc. of toluene. An excess of sodium is used to permit rapid reduction of the titanium tetrachloride to dichloride. The autoclave is flushed with argon and the mixture heated under argon at 110° C. for 3 hours, whereafter it is allowed to return to room temperature. All the titanium tetrachloride has disappeared.

4 g. of aluminium chloride and 2 g. of sodium are then introduced under argon. After further flushing with argon, the mixture is heated at 110° C. for 3 hours and cooled to room temperature.

80 g. of propylene are thereafter introduced and the mixture is heated. The operation is arbitrarily stopped after 5 hours, and there are obtained 17 g. of solid polypropylene.

If the argon is replaced by nitrogen, only 5 g. of polypropylene are obtained in the same period of time.

It will be understood that, while the special value of the new catalysts is in the production of polypropylene, they can also be used in the production of other polyolefines, e.g. polyethylene and copolymers of ethylene and propylene.

We claim:

1. Process for the production of solid polypropylene, which comprises polymerising propylene in the presence as catalyst of a mixture of titanium dichloride and aluminium, in which the aluminium has been obtained by reacting an aluminium trihalide with an alkali metal selected from the class consisting of sodium and potassium in a liquid organic medium which is inert to the reactants, is a solvent for the aluminium trihalide and is selected from the class consisting of aliphatic, cycloaliphatic and aromatic hydrocarbons, at a temperature such that the alkali metal melts, in an inert atmosphere and in the absence of reactive hydrocarbons, and stirring the reaction medium to disperse the molten alkali metal in the organic medium, the atomic ratio of aluminium to titanium in the said mixture being at least 2:1, and the said mixture being free from higher chlorides of titanium and from aluminium halides.

2. Process for the production of solid polypropylene, which comprises reducing an aluminium trihalide to aluminium by heating it with an alkali metal selected from the class consisting of sodium and potassium in a liquid organic medium which is inert to the reactants, is a solvent for the aluminium trihalide and is selected from the class consisting of aliphatic, cycloaliphatic and aromatic hydrocarbons, at a temperature such that the alkali metal melts, in an inert atmosphere and in the absence of reactive hydrocarbons, and stirring the reaction medium to disperse the molten alkali metal in the organic medium, and heating propylene to a polymerisation temperature in contact with a mixture of the aluminium so obtained with titanium dichloride which is free from aluminium trihalide and higher chlorides of titanium and in which the atomic ratio of aluminium to titanium it at least 2:1.

3. Process according to claim 2, in which the reduction of the aluminium trihalide is effected in an atmosphere of argon.

4. Process according to claim 2, in which the atomic ratio of aluminium to titanium is between 3:1 and 5:1.

5. Process according to claim 2, in which the aluminium obtained by the reduction of the aluminium trihalide is thoroughly washed with an aromatic hydrocarbon before the polymerisation of the propylene.

6. Process according to claim 2, in which the propylene is heated in contact with the said mixture to a temperature of 95–105° C. under a pressure of 10–50 atmospheres.

7. Process for the production of solid polypropylene which comprises reducing aluminium trichloride by heating a mixture thereof with titanium dichloride with an alkali metal selected from the class consisting of sodium and potassium in a liquid organic medium which is inert to the reactants, is a solvent for the aluminium trihalide and is selected from the class consisting of aliphatic, cycloaliphatic and aromatic hydrocarbons, at a temperature such that the alkali metal melts, in an inert atmosphere and in the absence of reactive hydrocarbons, and stirring the reaction medium to disperse the molten alkali metal in the organic medium, the atomic ratio of aluminium to titanium in the said mixture being at least 2:1 to form a mixture of aluminium and titanium dichloride free from aluminium trichloride and higher chlorides of titanium, and heating propylene in contact with the said resulting mixture of aluminium and titanium dichloride to a polymerisation temperature.

8. Process according to claim 7, in which the aluminium trichloride is reduced at a temperature of 80–110° C.

9. Process for the production of solid polypropylene which comprises heating a mixture of aluminium trichloride with a titanium chloride in which the valency of the titanium is at least 3 with an alkali metal selected from the class consisting of sodium and potassium in a liquid organic medium which is inert to the reactants, is a solvent for the aluminium trihalide and is selected from the class consisting of aliphatic, cycloaliphatic and aromatic hydrocarbons, at a temperature such that the alkali metal melts, in an inert atmosphere and in the absence of reactive hydrocarbons, and stirring the reaction medium to disperse the molten alkali metal in the organic medium, the quantity of alkali metal being sufficient to reduce the aluminium trichloride to aluminium and the said titanium chloride to titanium dichloride and continuing the process until these reductions are substantially complete, the atomic ratio of aluminium to titanium in the initial mixture being at least 2:1, and heating propylene in contact with the resulting mixture to a polymerisation temperature.

10. Process according to claim 9, in which the aluminium trichloride and the titanium chloride are reduced at a temperature of 80–110° C.

11. Process for the production of solid polypropylene, which comprises reducing an aluminium trihalide to aluminium by heating it with an alkali metal selected from the class consisting of sodium and potassium in a liquid organic medium which is inert to the reactants, is a solvent for the aluminium trihalide and is selected from the class consisting of aliphatic, cycloaliphatic and aromatic hydrocarbons, at a temperature such that the alkali metal melts, in an inert atmosphere and in the absence of reactive hydrocarbons, and stirring the reaction medium to disperse the molten alkali metal in the organic medium, subsequently mixing the product with titanium dichloride in amount such that the atomic ratio of aluminium to titanium is at least 2:1, to form a mixture free from aluminium trichloride and higher chlorides of titanium, and heating propylene in contact with the said mixture to a polymerisation temperature.

12. Process according to claim 11, in which the aluminium trichloride is reduced at a temperature of 80–110° C.

13. Process for the production of solid polypropylene, which comprises heating a mixture of 3–5 molecular proportions of aluminium trichloride and 1 molecular proportion of titanium dichloride to a temperature of 80–110° C. with an alkali metal selected from the class consisting of sodium and potassium in a liquid organic medium which is inert to the reactants, is a solvent for the aluminium trihalide and is selected from the class consisting of aliphatic, cycloaliphatic and aromatic hydrocarbons, at a temperature such that the alkali metal melts, in an inert atmosphere and in the absence of reactive hydrocarbons, and stirring the reaction medium to disperse the molten alkali metal in the organic medium, the quantity of alkali metal being sufficient to reduce the aluminium trichloride to aluminium, washing the solid product to ensure its complete freedom from aluminium trichloride, suspending the washed solid in an inert liquid diluent consisting essentially of at least one compound selected from the group defined above, and heating propylene in intimate contact with the resulting suspension to a temperature of 95–105° C. under a pressure of 10–50 atmospheres.

14. Process for the production of solid polypropylene, which comprises heating a mixture of 3–5 molecular proportions of aluminium trichloride and 1 molecular proportion of a chloride of titanium in which the valency of the titanium is at least 3 to a temperature of 80–110° C. with an alkali metal selected from the class consisting of sodium and potassium in a liquid organic medium which is inert to the reactants, is a solvent for the aluminium trihalide and is selected from the class consisting of aliphatic, cycloaliphatic and aromatic hydrocarbons, at a temperature such that the alkali metal melts, in an inert atmosphere and in the absence of reactive hydrocarbons, and stirring the reaction medium to disperse the molten alkali metal in the organic medium, the quantity of alkali metal being sufficient to reduce the aluminium trichloride to aluminium and the titanium chloride to titanium dichloride, washing the solid product to ensure its complete freedom from aluminium trichloride, suspending the washed solid in an inert liquid diluent consisting essentially of at least one compound selected from the group defined above, and heating propylene in intimate contact with the resulting suspension to a temperature of 95–105° C. under a pressure of 10–50 atmospheres.

15. Process for the production of a catalyst suitable for use in the production of solid polypropylene, which comprises reacting an aluminium trihalide with an alkali metal selected from the class consisting of sodium and potassium in a liquid organic medium which is inert to the reactants, is a solvent for the aluminium trihalide and is selected from the class consisting of aliphatic, cycloaliphatic and aromatic hydrocarbons, at a temperature such that the alkali metal melts, in an inert atmosphere and in the absence of reactive hydrocarbons, and stirring the reaction medium to disperse the molten alkali metal in the organic medium, and forming a mixture of the aluminium so obtained and titanium dichloride in which the atomic ratio of aluminum to titanium is at least 2:1.

16. A catalyst for the production of solid polypropylene comprising a mixture of at least 2 atomic proportions of aluminium with 1 molecular proportion of titanium dichloride in which the aluminium has been obtained by reacting an aluminium trihalide with an alkali metal selected from the class consisting of sodium and potassium in a liquid organic medium which is inert to the reactants, is a solvent for the aluminium trihalide and is selected from the class consisting of aliphatic, cycloaliphatic and aromatic hydrocarbons, at a temperature such that the alkali metal melts, in an inert atmosphere and in the absence of reactive hydrocarbons, and stirring the reaction medium to disperse the molten alkali metal in the organic medium.

References Cited in the file of this patent

UNITED STATES PATENTS

| | | |
|---|---|---|
| 2,868,771 | Ray et al. | Jan. 13, 1959 |
| 2,878,240 | Schmerling | Mar. 17, 1959 |
| 2,899,416 | Schreyer | Aug. 11, 1959 |
| 2,899,418 | Reynolds | Aug. 11, 1959 |
| 2,925,410 | Coover | Feb. 16, 1960 |

FOREIGN PATENTS

| | | |
|---|---|---|
| 777,538 | Great Britain | June 26, 1957 |
| 1,155,962 | France | Dec. 9, 1957 |
| 1,170,777 | France | Sept. 29, 1958 |

OTHER REFERENCES

Mellor: A Comprehensive Treatise on Inorganic and Theoretical Chemistry, vol. 5, page 160 (1924), Longmans Green & Co. (New York, N.Y.).